United States Patent [19]

Jones

[11] Patent Number: 4,907,732

[45] Date of Patent: Mar. 13, 1990

[54] RIGHT-OF-WAY DOUBLE JOINTER

[76] Inventor: Richard L. Jones, 3776 Garnett, Houston, Tex. 77005

[21] Appl. No.: 147,233

[22] Filed: Jan. 22, 1988

[51] Int. Cl.$^4$ .................. B23K 31/06; B23K 37/04
[52] U.S. Cl. .................. 228/44.5; 228/49.3; 198/300; 198/302; 198/312
[58] Field of Search .............. 228/44.5, 49.3; 285/62; 198/300, 302, 312; 29/282; 219/60 A

[56] References Cited

U.S. PATENT DOCUMENTS

| | | | |
|---|---|---|---|
| 3,598,347 | 8/1971 | Marburger | 248/2 |
| 3,744,259 | 7/1973 | Wagley | 61/72.5 |
| 3,984,007 | 10/1976 | Birdwell | 29/282 |
| 4,286,914 | 9/1981 | Davidson, Jr. | 414/460 |
| 4,591,294 | 5/1986 | Foulkes | 405/170 |

FOREIGN PATENT DOCUMENTS 7709000  2/1979  Netherlands ............ 228/49.3

*Primary Examiner*—M. Jordan
*Assistant Examiner*—Samuel M. Heinrich
*Attorney, Agent, or Firm*—Steve Rosenblatt

[57] ABSTRACT

An apparatus is disclosed for joining pipe sections on or along side a pipeline right-of-way. The apparatus comprises a main frame and one or more telescoping subframes. The two pipe sections are supported in a first position where their ends are beveled. The two pipe sections are moved to a second position where they are pushed together, held in place with a clamp, and rolled while a welding head joins the two pipe sections. The joined pipe sections are moved to a third position to await removal from the apparatus by a crane. In the meantime, pipe sections are continually loaded and unloaded from the apparatus so that pipe sections can be joined on a continuous basis. The subframe telescopes into and out of the main frame to support a pipe section thereon. Road wheels and tractor wheels are provided on the main frame to allow the apparatus to be transported and positioned along the pipeline right-of-way in inaccessible and remote locations.

27 Claims, 3 Drawing Sheets

RIGHT-OF-WAY DOUBLE JOINTER

FIELD OF THE INVENTION

The field of the invention relates to machinery for joining two pipe sections together in remote areas on or adjacent to pipeline right-of-ways.

BACKGROUND OF THE INVENTION

In the past, various devices have been implemented for field joining of pipe. U.S. Pat. No. 4,286,914 discloses a means and method for connecting large pipe. The '914 patent discloses a self-propelled vehicle having a pair of grappling devices supported from the vehicle and powered by an operating device. The vehicle, while maintaining an elongated pipe within the grappling device, moves in a horizontal direction to connect the held pipe with previously laid pipe. While the vehicle moves toward the previously laid pipe, the carried pipe may be moved to the left or right simultaneously or simultaneously raised or lowered to align it with the previously laid pipe. When slip joint pipe is being laid, it may be forcibly connected to the previously laid pipe by the kinetics of the vehicle. When slip joint pipe is laid, no other means need be used to keep the pipes fastened together other than the frictional force caused by the forcible insertion of one pipe in another. The vehicle described in the U.S. Pat. No. 914 patent has limited application for use with welded pipe.

U.S. Pat. No. 3,598,347 discloses a side boom tractor to which is mounted a welder. The two sections to be joined are manually placed in position on a pile of timbers. The welder located at the end of the side boom is adjustable for placement over the joint formed between the two pipe sections which have previously been balanced on temporary supports.

U.S. Pat. No. 3,744,259 illustrates a machine designed for laying large diameter pipe over rough terrain in extreme climates. The machine was used for laying 48 inch steel pipe on the Alaska pipeline. The machine comprises an elongated enclosed vehicle which straddles a ditch in which the pipe is to be laid. The housing is supported in each of the corners by pillars in order to maintain the housing level. The pipe is supported through the housing on carriages which are free to float from side to side and up and down. The pipe is constructed with all its bends and crooks over the support position and the house follows the ditch providing a warm environment for the workmen. A deck section follows the carriages up and down so that the workers have a platform which is always maintained at a fixed position relative to the pipe. As the vehicle moves forward out from under the pipe, the pipe is lowered by a series of trailing roller jacks. A sleeve surrounds the pipe as it leaves the vehicle so that the temperature of the pipe is gradually changed from the relatively warm temperature to the frigid arctic temperature. This machine is a special use vehicle for frigid conditions and is extremely long and thereby has limited functions in rough terrain such as jungle areas.

U.S. Pat. No. 4,591,294 discloses in FIG. 8 a self-propelled platform supported on large diameter wide-tired twin-wheels at the front and rear ends and also at the center. The wheels are independently suspended and independently driven and steered. A crane is mounted on the vehicle for loading pipes from transport trucks onto a pipe storage area 83 immediately behind the crane. The pipe lengths are fed from the storage area to welding assembly 42 which is mounted toward the rear of the vehicle. Crawler tracks are used under the welding assembly when the vehicle crosses rough terrain. The tracks can be raised out of contact with the ground when not required. At the completion of the welded joint, the whole vehicle moves forward a sufficient distance to bring the next joint to be welded into the welding assembly.

U.S. Pat. No. 3,984,007 discloses a pipe handling apparatus for pipe laying barges. The pipe is lifted from an incoming pipe conveyor to a transverse rack from one rack position to another and from the rack to the pipe lineup conveyors by a series of pivotal lifting means which lift, move, and deposit the pipe without impact or shock, whereby the pipe and any concrete or other coating on the pipe is not damaged. The '007 patent also discloses a universally adjustable lineup conveyor apparatus.

In the past, and presently, for pipelines that are being installed in fairly wide open spaces, it has been desirable to perform as many pipeline welds under controlled shop conditions and ship the longest lengths practicable to the pipeline ditch site for final welding. However, problems have arisen in inaccessible terrains such as jungles and mountainous regions where access has been a problem. In those situations, it is still desirable to perform as many pipeline welds as possible under conditions which closely resemble those found in a fabrication shop. In remote and inaccessible areas, it is impracticable to join several lengths of pipe together since such long segments of pipe would not be easily transportable to the pipeline right of way. Thus, in the past, for pipelines in inaccessible locations, there have been no attempts to connect two or three pipe lengths together when shipped to the closest port of call to the pipeline right-of-way. Instead, individual lengths, each about 12 meters long, are shipped to the right-of-way for field joining each length to the next adjacent length.

It is the object of this invention to provide a vehicle which is compact in design and, therefore, capable of being transported to the pipeline right-of-way even in remote locations with very limited acessibility.

It is a further object of this invention to provide an apparatus which can be parked along the pipeline right-of-way at a point approximately in the middle of that day's production along the pipeline for making, on a continuous basis, joints between two sections of pipe which will then be strung along the right-of-way for subsequent welding into the pipeline.

It is a further object of this invention to provide a light-weight apparatus which can be brought into remote and inaccessible areas and which is fully self-contained and capable of continuous welding of pairs of pipe sections to each other.

SUMMARY OF THE INVENTION

An apparatus is disclosed for joining pipe sections on or along side a pipeline right-of-way. The apparatus comprises a main frame and one or more telescoping subframes. The two pipe sections are supported in a first position where their ends are beveled. The two pipe sections are moved to a second position where they are pushed together, held in place with a clamp, and rolled while a welding head joins the two pipe sections. The joined pipe sections are moved to a third position to await removal from the apparatus by a crane. In the meantime, pipe sections are continually loaded and unloaded from the apparatus so that pipe sections can be joined on a continuous basis. The subframe telescopes into and out of the main frame to support a pipe section thereon. Road wheels and tractor wheels are provided on the main frame to allow the apparatus to be transported over paved roads and along the pipeline right-of-way.

DETAILED DESCRIPTION OF THE PREFERRED EMBODIMENT

Figure 2:
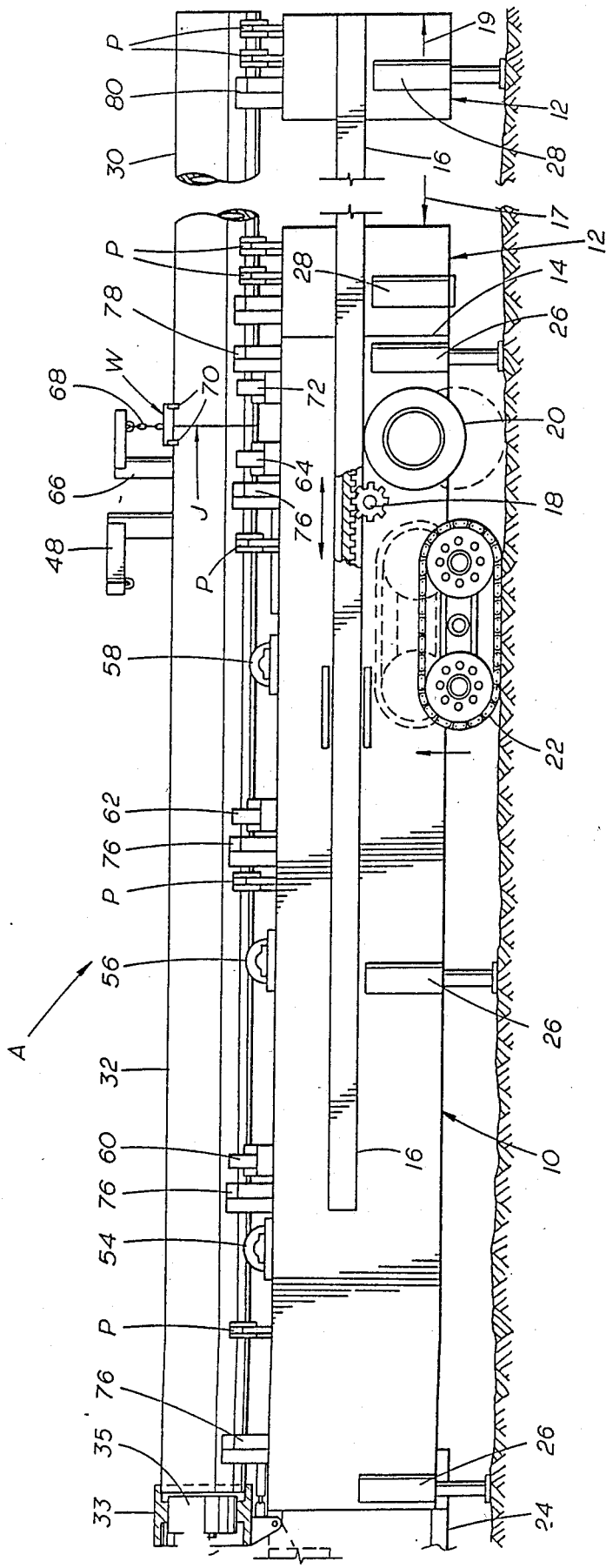
FIG. 2 illustrates an elevational view of the apparatus.

Shown in FIG. 2 the apparatus A includes an elongated main frame 10 and a subframe 12. Subframe 12 is movably mounted to main frame 10. Subframe 12 extends from end 14 of main frame 10 and is connected thereto by gear racks (one on each side) 16 which are driven by motor and pinion gear 18 mounted on frame 10. Subframe 12 can be formed with multiple telescoping components each movable with respect to the other to provide shorter spans for supporting pipe section 30. Other connection methods between main frame 10 and subframe 12 can be employed without departing from the spirit of the invention. Motor 18 can be selectively actuated to move subframe 12 from a position adjacent end 14 (retracted position arrow 17) and to a second position shown in FIG. 2 with rack 16 projecting out of end 14 (extended position arrow 19).

Frame 10 has a plurality of over-the-road tires 20. Tires 20 are retractably mounted as are track wheels 22. Thus, depending on whether the apparatus A is traveling over a paved highway or off the road in rugged terrain, either tires 20 or track wheels 22 can be selectively positioned for contact with the support surface. Tires 20 and/or track wheels 22 can be mounted within the footprint of frame 10 to allow maintenance of a width of frame 10 to preferrably be 3 meters or less. It should be noted that the configuration of the apparatus A shown in FIG. 2 is that of a trailer to be towed behind another vehicle. To that end, a hitch 24 is provided for connecting the apparatus A to a pulling vehicle (not shown). Alternatively, the apparatus A could be configured as a self-propelled vehicle in which case there would be no hitch 24 and suitable wheels such as tires 20 and/or track wheels 22 would be outfitted on the front end of frame 10. Suitable steering mechanisms would also have to be provided within frame 10 to guide the vehicle to its desired destination.

Figure 1:
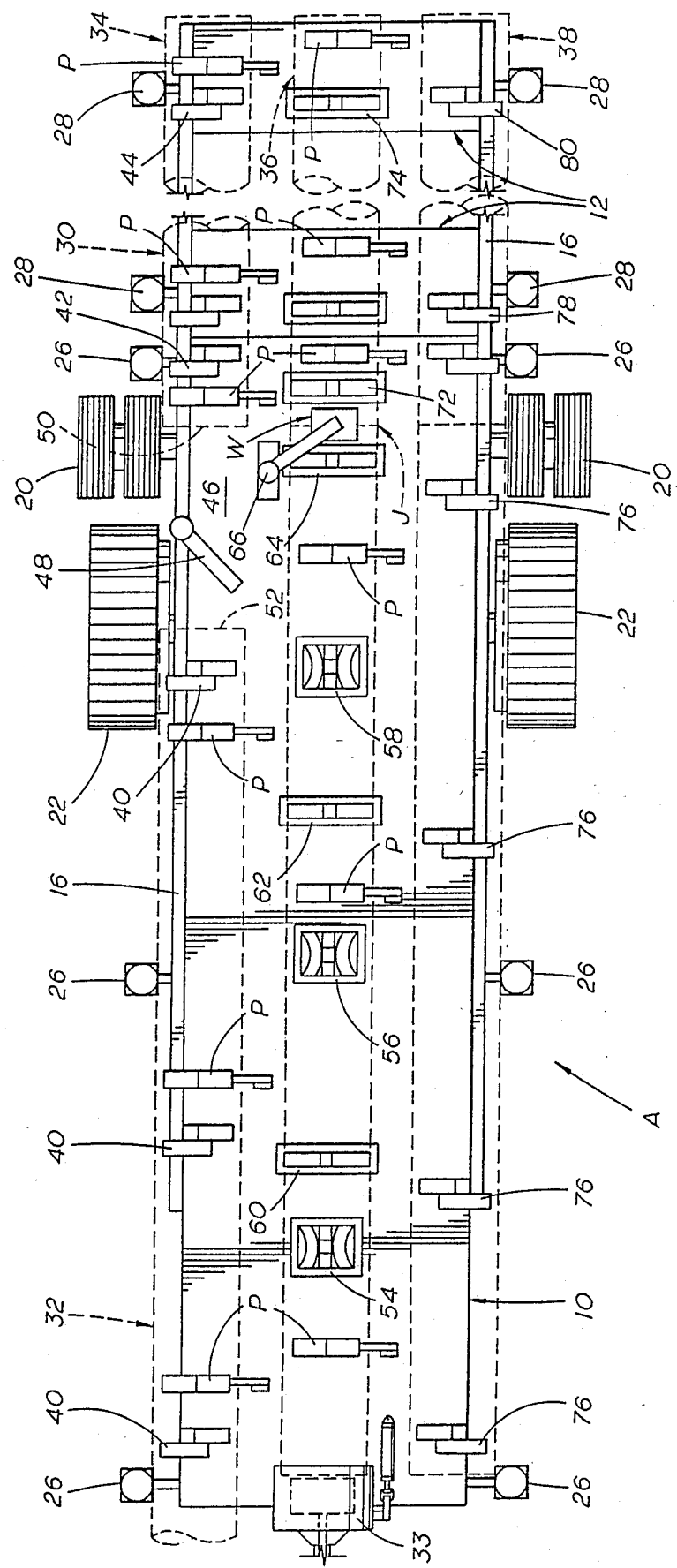
FIG. 1 illustrates a plan view of the apparatus.

A plurality of stabilizers or outriggers 26 are disposed around the periphery of frame 10. When the apparatus A is placed into position along side a pipeline right-of-way, the outriggers 26 are hydraulically or otherwise actuated to level the apparatus A and securely position it against any impacts from the loading or unloading operations thereon. When the outriggers 26 are placed in the position as shown in FIG. 2 along side a pipeline right-of-way, subframe 12 is extended from main frame 10 out of end 14. When the subframe 12 is fully extended, retractable hydraulic stabilizers or outriggers 28 are extended from the subframe 12 to similarly securely position subframe 12 on the support surface adjacent to the pipeline right-of-way. The outriggers 28 are substantially similar in design as outriggers 26 on the main frame 10. The placement of pipes 30 and 32 to be joined on top of main frame 10 and subframe 12 is illustrated in FIG. 1. Pipes 30 and 32 pass from a first position 34, to a second position 36 and to a third position 38. A plurality of pipe supports 40 are disposed in alignment on top of frame 10 to support pipe section 32 in first position 34. Pipe support 42 and pipe support 44 support pipe 30. As shown in FIG. 1, pipe 30 is supported on main frame 10 and the extended subframe 12. Pipe support 42 is disposed on frame 10 while pipe support 44 is disposed on subframe 12. Together, pipe supports 42 and 44, when subframe 12 is in the extended position, support pipe 30 in the first position 34.

As shown in FIG. 1, when pipes 30 and 32 are placed in the first position 34, they are in substantial alignment but a gap 46 is left between pipe sections 30 and 32. It should be noted that a locally available crane adjacent the pipeline right-of-way is employed to load the pipe sections 30 and 32 into first position 34. Alternatively, a rack can be provided so that each successive pipe section 30 and 32 can roll or be placed in first position 34.

A facing machine support boom 48 is shown schematically in FIG. 1. The facing machine (not shown) is mounted to support boom 48 so that it may move within gap 46 and into contact with ends 50 and 52 of pipes 30 and 32, respectively. The facing machine is of a type that is known in the art and produces a bevel on ends 50 and 52 so that ends 50 and 52 can be welded together.

After ends 50 and 52 have been adequately beveled, positioning means P (FIG. 3) contacts pipes 30 and 32 and moves them into second position 36. Once in second position 36, pipe 32 can be moved along its longitudinal axis by employing endo rollers 54, 56 and 58. Depending on the size of pipe handled and the design of the endo rollers 54, 56 and 58, one or more endo rollers 54, 56 and 58 can be power driven while the remaining endo rollers can be simply idler rollers. In the preferred embodiment, endo rollers 54 and 58 are powered. It can be seen by comparing the position of pipe 32 in first position 34 and second position 36, that pipe 32 has been translated along its longitudinal axis by virtue of endo rollers 54, 56 and 58. On the other hand, as shown in FIG. 1, pipe 30 does not interact with any endo rollers in second position 36. If no endo rollers are provided for pipe 30, the pipe 30 should be properly indexed in first position 34 so that it is in the proper position when moved to second position 36. Alternatively, and without departing from the spirit of the invention, endo rollers can be provided to interact with pipe 30 in second position 36. In that situation, both pipes 30 and 32 can be manipulated in a direction parallel to their longitudinal axis when placed in second position 36. It should be noted, however, that the addition of endo rollers to interact with pipe 30 and second position 36 will lengthen the main frame 10 as well as add additional weight to subframe 12. Yet another alternative is to provide a hydraulic or other mode of powered device that can grab pipe 30 and translate it in position 36.

However, if no further indexing of pipe 30 is permitted, it must be properly placed in first position 34 so that it will be in the proper position when moved by positioning means P into second position 36. A travel stop (not shown) can be provided for pipe 30 in first position 34. The use of a travel stop will effectively index pipe 30 so that it will be in the proper position when moved from first position 34 to second position 36.

It should be noted that when translating pipe 32 on endo rollers 54, 56 and 58, the pipe may be pulled over rollers 60, 62 and 64. To avoid dragging pipe section 32 over rollers 60, 62 and 64, endo rollers 54, 56 and 58 can be movably mounted so that they can retract into frame 10 during the operation of rollers 60, 62 and 64. In the preferred embodiment, endo rollers 54 and 58 are powered while endo rollers 56 serve as idlers when pipe 32 is translated along its longitudinal axis.

After pipe 32 is in position adjacent to pipe 30, as shown in second position 36 in FIG. 2, a floating welding head mount W supported by an adjustable boom 66 is brought into place. The adjustable boom 66 can be selectively operated to place welding head mount W in position over the joint J. The expendable materials involved in the welding process, including compressed gases, can be stored in frame 10. The position of joint J with respect to frame 10 can be within a range acessible to welding head mount W. A flexible connection 68 allowing for vertical compensating motion is used between boom 66 and welding head mount W. Furthermore, a plurality of wheels 70 are disposed on welding head mount W to facilitate "floating" contact between welding head mount W and pipes 30 and 32 while the joint J is being made.

As previously explained, endo rollers 54, 56 and 58 can be retractably mounted so as not to interfere with the rotation of pipe 32. Alternatively, endo rollers 54, 56 and 58 can drag pipe 32 over rollers 60, 62 and 64 to place pipe section 32 in position for welding as shown in FIG. 1 and generally indicated by number 36. With pipe 32 firmly in position against pipe 30 in second position 36, boom 66 is used to position welding head mount W over the joint as shown in FIG. 1. Flexible connection 68 allows for vertical translation of welding head mount W in response to any out of roundness of pipe 30 or 32.

After positioning pipes 30 and 32 adjacent to each other, clamp nest 33 is placed in the position shown in FIG. 2. A clamp device 35 of a type well known in the art is pneumatically actuated to translate through pipe section 32 to joint J. When positioned in pipes 30 and 32 adjacent to joint J, the clamp is pneumatically actuated to hold pipes 30 and 32 in position during the forthcoming welding step. Alternatively pipes 30 and 32 can be aligned by a combination internal lineup clamp/internal welding head (not shown) which would also make a weld pass on the inside of the joint. Alternatively, an external lineup clamp can be used to align the pipes while making one or more weld passes on the inside of the pipe manually or mechanically.

In order to make the girth weld, rollers 60, 62 and 64 are employed to rotate pipe 32. In the preferred embodiment, rollers 60 and 64 are motorized while rollers 62 are idle rollers. Rollers 72 and 74 are used to roll pipe 30 at the same speed as pipe 32. As shown in FIG. 1, rollers 72 are mounted on main frame 10 while rollers 74 are mounted on subframe 12.

It should be noted that a wide variety of known welding techniques can be employed in conjunction with welding head mount W. Additionally, it is within the scope of the invention to provide a housing over joint J to shield the joint J from the elements while the joint is welded. However, for the purposes of clarity, any such housing has been eliminated from the drawings. It is apparent from FIGS. 1 and 2 that the entire joint can be made with welding head mount W remaining essentially stationary while rollers 60, 62, 64, 72 and 74 rotate pipes 30 and 32 at a constant speed as the joint is being made.

After the weld is complete, the boom 66 is activated to move welding head mount W away from joint J. The pipes 30 and 32 are now fully joined together in second position 36 (see FIG. 1). It should be noted that the weld which has just been made in joint J could be x-rayed while the pipes 30 and 32 are in second position 36. Alternatively, the weld can be x-rayed in position 38 or at a remote location from the apparatus A in order to avoid interfering with the activities of adjacent personnel working around the apparatus A.

Figure 3:
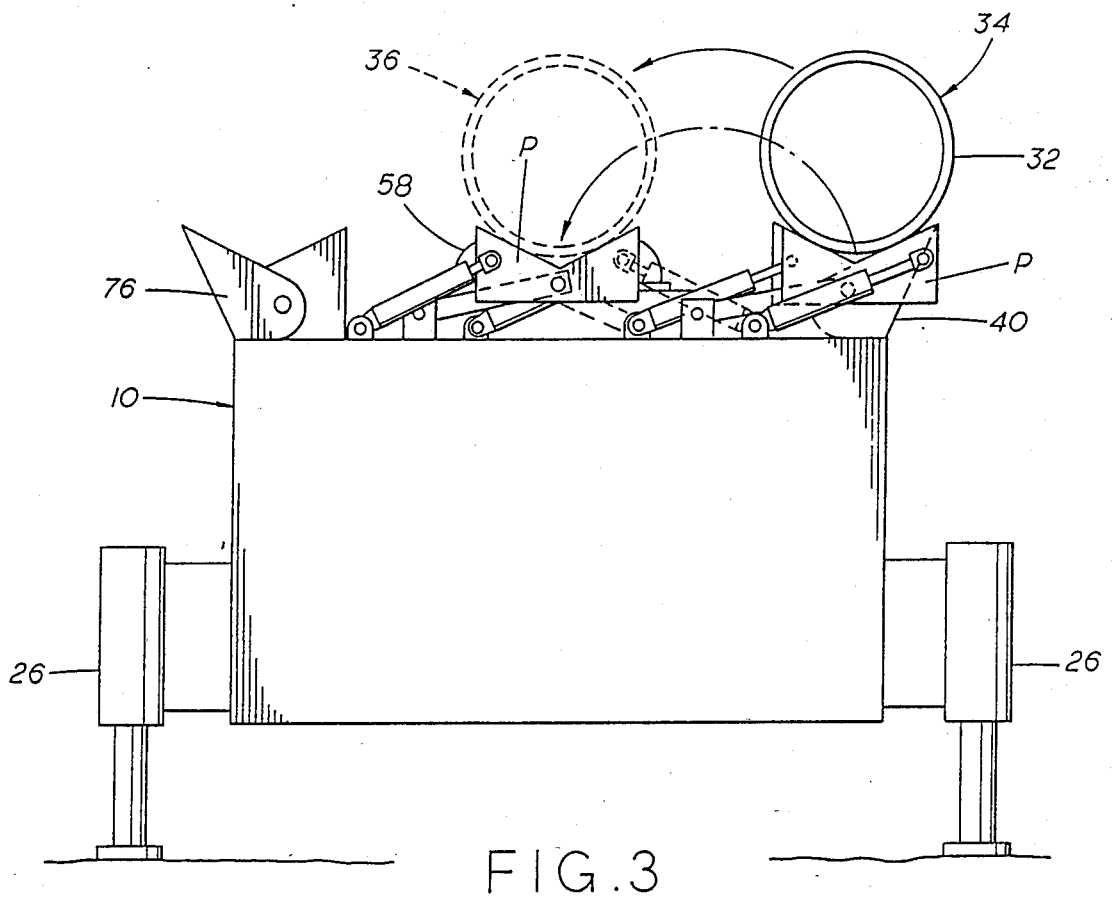
FIG. 3 illustrates a section view through the apparatus illustrating pipes in the first and second positions.
Figure 4:
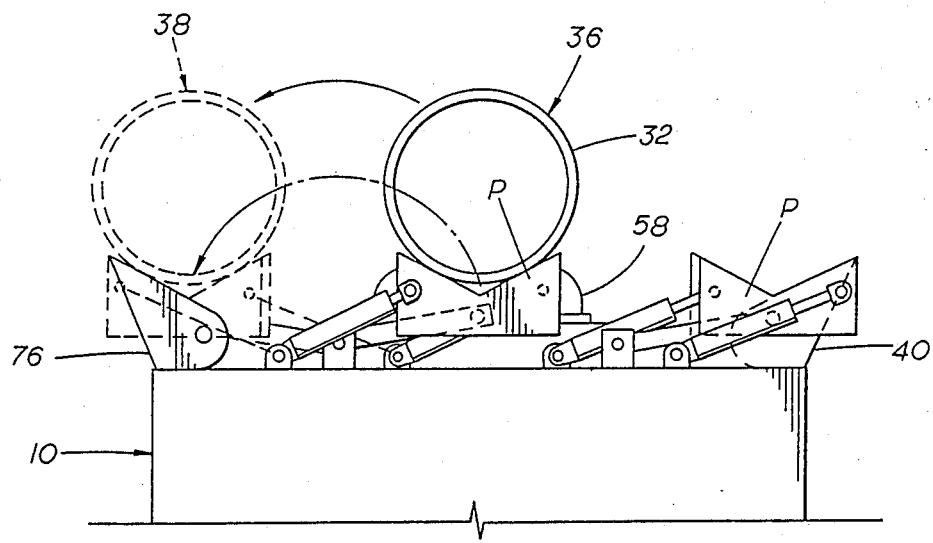
FIG. 4 is a sectional view through the apparatus illustrating pipe sections in the second and third positions.

Having completed the welding of the joint J, the pipe segments 30 and 32 are moved from second position 36 to third position 38. Supports 76 are in alignment and mounted to frame 10. Supports 78 and 80 are also in alignment with supports 76. However, support 78 is mounted on main frame 10 while support 80 is mounted on subframe 12. As shown in FIGS. 3 and 4, positioning means P are used to move pipe sections 30 and 32 from second position 36 to third position 38 (see FIG. 1). The joined pipe sections remain in third position 38 until a crane or other suitable lifting device is brought adjacent to the apparatus A to remove the joined pipe sections from supports 76, 78 and 80 and to carry such pipe sections to a nearly temporary storage locations or to a position along the pipeline right-of-way where it can be joined to previously welded sections to become part of the pipeline.

Although FIGS. 1 and 2 indicate the pipes 30 and 32 to be in the same horizontal plane while in positions 34, 36 and 38, gravity can be employed to aid in shifting the pipe sections 30 and 32 from position 34 through position 36 to position 38. Stated differently, the pipes 30 and 32 in position 34 can be at a higher elevation than the pipes in position 36 and similarly in position 38. The positioning means P can be designed to take into account a change in height and can be much more simple in design if gravity is employed to shift among the pipe positions 34, 36 and 38.

As can readily be seen, the apparatus A can be employed to continuously join pipe sections similar to sections 30 and 32 with two sections always in first position 34 being faced by a facing machine supported by boom 48, two sections being joined in second position 36 and two sections awaiting transport off the apparatus in third position 38.

It is within the spirit of the invention to streamline the apparatus A to include merely the equipment illustrated in FIG. 1 in second position 36. The beveling function of the facing machine can also be incorporated into the apparatus A which merely contains all the equipment illustrated in position 36 of FIG. 1. In this manner, some advantage can be made of the apparatus A; however, the production would be slower and more discontinuous in the absence of positions 34 and 38. It is also within the scope of the invention to provide an apparatus A having the equipment shown in position 36 of FIG. 1 and excluding endo rollers 54, 56 and 58. In that embodiment, the pipes 30 and 32 would have to be positioned in position 36 already beveled and with ends 50 and 52 adjacent each other. Under that scenario, rollers 60, 62, 64, 72 and 74 would be employed to roll both pipes 30 and 32 while the joint J is being welded.

In use, the apparatus A would be parked in the middle of that day's production and moved on a daily basis. After completion of a working day, all of the pipe sections are unloaded from the apparatus A, outriggers 26 and 28 are brought to their raised and retracted position, subframe 12 is brought to its retracted position by a selected operation of motor 18, and the facing machine and welding head mount W are securely fastened to frame 10 prior to movement of the apparatus A. As shown in FIGS. 3 and 4, supports in positions 34 and 38 can be folded so as not to protrude from the main body of the frame 10. Similarly, supports 44 and 80 can be hinged so that they do not protrude, thus increasing the width of the apparatus A.

Many different size pipes can be accommodated by the apparatus A. By virtue of the retractable wheels 20 or track wheels 22 and further as a result of the streamlined design of the apparatus A, the apparatus A is capable of traveling over paved roads as well as unpaved rough terrain to reach inaccessible locations. Thus, all the advantages of constructing a pipeline in a readily accessible location can be realized by using the apparatus A and locating the apparatus in the middle of each days production. By virtue of use of the apparatus A, half the welds in the pipeline are made under near-ideal conditions and on a continuous basis.

The foregoing disclosure and description of the invention are illustrative and explanatory thereof, and various changes in the size, shape, and materials, as well as in the details of the illustrated construction may be made without departing from the spirit of the invention.

What I claim is:

1. A mobile apparatus for making girth welds between two sections of pipe comprising:
   an elongated main frame;
   at least one subframe movably mounted to said main frame and selectively movable from a retracted position wherein said subframe is nested substantially within said main frame, and movable to an extended position wherein said subframe is substantially extended out of said main frame;
   positioning means on said main and subframes for movement of both pipe sections;
   welding means on said frame for attaching two pipe sections together; and
   wheel means on said main frame to allow said main and sub frame to travel over roadways and to remote sites.

2. The apparatus of claim 1, wherein said wheel means further comprises:
   a plurality of road wheels;
   a plurality of track wheels; and
   means for selectively positioning said road wheels and said track wheels into contact with a support surface to allow the apparatus to travel on paved and unpaved support surfaces.

3. The apparatus of claim 2, further comprising:
   first outrigger means associated with said main frame for selectively leveling and stabilizing said main frame to a position where said road and said track wheels are suspended above a support surface and the weight of said main frame is supported substantially from said first outrigger means; and
   second outrigger means associated with said subframe for selectively leveling and stabilizing said subframe.

4. The apparatus of claim 3, durther comprising:
   drive means mounted with said main and subframes for moving said subframe between said retracted and said extended position.

5. The apparatus of claim 3, wherein said positioning means further comprise:
   a movable clamp adapted to be advanced within one pipe section to a position adjacent a joint formed with an adjacent pipe section;
   means for positioning said movable clamp to secure two pipe sections adjacent each other and in alignment during the operation of said welding means.

6. The apparatus of claim 5, wherein said positioning means further comprises:
   at least one power roller on said main frame;
   at least one power roller on said subframe;
   said welding means comprising a welding head and means for positioning said welding head adjacent a joint formed by a first and second pipe section;
   said welding head spanning the joint and floating along the outer surfaces of the two pipe sections and welding the two pipe sections together as said first and second power rollers cause both pipe sections to rotate about their longitudinal axis in tandem.

7. The apparatus of claim 6, wherein said positioning means further comprises:
   at least one powered endo roller mounted to said main frame for selective translation of one pipe section along its longitudinal axis and into contact with an adjacent pipe section.

8. The apparatus of claim 7, wherein said positioning means further comprises:
   a plurality of idle rollers on said main frame to support a pipe section and facilitate the operation of said power roller on said main frame;
   a plurality of power rollers on said main frame with at least one such power roller mounted close to one end of said main frame such that a joint formed by two pipe sections is disposed between two power rollers mounted to said main frame;
   said power roller on said subframe and said power roller close to one end of said main frame supporting one pipe section when said subframe is in said extended position; and
   at least one nonpowered endo roller on said main frame cooperating with said powered endo roller to support a pipe section on said main frame and to facilitate its translation along its longitudinal axis into contact with an adjacent pipe section.

9. The apparatus of claim 7, wherein said positioning means further comprises:
   a plurality of first pipe supports on said main and said subframe disposed in longitudinal alignment for supporting a first and second pipe section in substantial alignment in a first position where the two pipe sections can be positioned spaced apart from each other; and
   facing means mounted to said main frame selectively positionable adjacent the space ends of two pipe sections supported on said first pipe supports for forming a bevel on each of the spaced ends.

10. The apparatus of claim 9, wherein:
    said power roller on said main frame and said endo roller are disposed in alignment for supporting two pipe sections in a second position parallel to said first position; and
    means for selectively shifting a first and second pipe section from said first position after beveling to said second position for welding.

11. The apparatus of claim 10, wherein said positioning means further comprises:
    a plurality of second pipe supports on said main and said subframe disposed in longitudinal alignment for supporting a joined first and second pipe section in a third position; and means for selectively shifting the joined pipe sections from said second to said third position.

12. The apparatus of claim 1, wherein said positioning means further comprises:
a movable clamp adapted to be advanced within one pipe section to a position adjacent a joint formed with an adjacent pipe section;
means for positioning said movable clamp to secure two pipe sections adjacent each other and in alignment during the operation of said welding means.

13. The apparatus of claim 12, wherein said positioning means further comprises:
at least one power roller on said main frame;
at least one power roller on said subframe;
said welding means comprising a welding head and means for positioning said welding head adjacent a joint formed by a first and second pipe section; and
said welding head spanning the joint and floating along the outer surfaces of the two pipe sections and welding the two pipe sections together as said first and second power rollers cause both pipe sections to rotate about their longitudinal axis.

14. The apparatus of claim 13, wherein said positioning means further comprises:
at least one powered endo roller mounted to said main frame for selective translation of one pipe section along its longitudinal axis and into contact with an adjacent pipe section.

15. The apparatus of claim 14, wherein said positioning means further comprises:
a plurality of idle rollers on said main frame to support a pipe section and facilitate the operation of said power roller on said main frame;
a plurality of power rollers on said main frame with at least one such power roller mounted close to one end of said main frame such that a joint formed by two pipe sections is disposed between two power rollers mounted to said main frame;
said power roller on said subframe and said power roller close to one end of said main frame supporting one pipe section when said subframe is in said extended position; and
at least one nonpowered endo roller on said main frame cooperating with said powered endo roller to support a pipe section on said main frame and to facilitate its translation along its longitudinal axis into contact with an adjacent pipe section.

16. The apparatus of claim 15, wherein said positioning means further comprises:
a plurality of first pipe supports on said main and said subframe disposed in longitudinal alignment for supporting a first and second pipe section in substantial alignment in a first position where the two pipe sections can be positioned spaced apart from each other;
facing means mounted to said main frame selectively positionable adjacent the spaced ends of two pipe sections supported on said first pipe supports for forming a bevel on each of the spaced ends.

17. The apparatus of claim 16, wherein:
said power roller on said main frame and said endo roller are disposed in alignment for supporting two pipe sections in a second position parallel to said first position; and means for selectively shifting a first and second pipe section from said first position after beveling to said second position for welding.

18. The apparatus of claim 17, wherein said positioning means further comprises:
a plurality of second pipe supports on said main and said subframe disposed in longitudinal alignment for supporting a joined first and second pipe section in a third position; and
means for selectively shifting the joined pipe sections from said second to said third position.

19. The apparatus of claim 1, wherein said positioning means further comprises:
a plurality of first pipe supports on said main and said subframe disposed in longitudinal alignment for supporting a first and second pipe section in substantial alignment in a first position where the two pipe sections can be positioned spaced apart from each other;
facing means mounted to said main frame selectively positionable adjacent the spaced ends of two pipe sections supported on said first pipe supports for forming a bevel on each of the spaced ends.

20. The apparatus of claim 19, wherein said positioning means further comprises:
at least one power roller on said main frame;
at least one power roller on said subframe;
at least one endo roller on said main frame;
said power rollers and said endo roller in alignment on an axis parallel to said first position and adapted to support two pipe sections in a second position; and
means for selectively shifting a first and second pipe section from said first position to said second position.

21. The apparatus of claim 20, wherein said positioning means further comprises:
a plurality of second pipe supports on said main and said subframes disposed in longitudinal alignment for supporting a joined first and second pipe section in a third position;
means for selectively shifting the joined pipe sections from said second to said third position.

22. The apparatus of claim 21, wherein:
said welding means joins two pipe sections in said second position;
said second position is disposed between said first and third positions;
said first, second and third positions are atop of said main and said subframes and do not extend laterally beyond said wheel means; and
said facing means adapted to face the pipe section ends in said first position.

23. The apparatus of claim 22 wherein said main frame further comprises:
a hitch mounted to the opposite end of said frame from the end where said subframe extends, to allow the apparatus to be towed to remote locations and over roads by another vehicle.

24. The apparatus of claim 18, wherein:
said welding means joins two pipe sections in said second position;
said second position is disposed between said first and third positions;
said first, second and third positions are atop of said main and said subframes and do not extend laterally beyond said wheel means; and said facing means adapted to face the pipe section ends in said first position.

25. The apparatus of claim 24, wherein said main frame further comprises:
 a hitch mounted to the opposite end of said frame from the end where said subframe extends, to allow the apparatus to be towed to remote locations and over roads by another vehicle.

26. The apparatus of claim 11, wherein:
 said welding means joins two pipe sections in said second position;
 said second position is disposed between said first and third positions;
 said first, second and third positions are atop of said main and said subframes and do not extend laterally beyond said wheel means; and
 said facing means adapted to face the pipe section ends in said first position.

27. The apparatus of claim 26, wherein said main frame further comprises:
 a hitch mounted to the opposite end of said frame from the end where said subframe extends, to allow the apparatus to be towed to remote locations and over roads by another vehicle.

* * * * *